United States Patent
Hui et al.

(10) Patent No.: US 9,577,914 B2
(45) Date of Patent: Feb. 21, 2017

(54) ELIMINATING IPV6 NEIGHBOR SOLICITATIONS IN CONSTRAINED COMPUTER NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 559 days.

(21) Appl. No.: 13/652,887

(22) Filed: Oct. 16, 2012

(65) Prior Publication Data
US 2014/0105211 A1 Apr. 17, 2014

(51) Int. Cl.
| | | |
|---|---|---|
| H04L 12/52 | (2006.01) | |
| H04L 12/751 | (2013.01) | |
| H04L 12/733 | (2013.01) | |
| H04L 12/721 | (2013.01) | |
| H04L 12/741 | (2013.01) | |

(52) U.S. Cl.
CPC ............... *H04L 45/02* (2013.01); *H04L 45/20* (2013.01); *H04L 45/72* (2013.01); *H04L 45/74* (2013.01); *H04L 2212/00* (2013.01)

(58) Field of Classification Search
CPC ...................................................... H04L 12/28
USPC ................................................. 370/389.392
See application file for complete search history.

(56) References Cited

U.S. PATENT DOCUMENTS

| | | | |
|---|---|---|---|
| 7,702,765 B1 | 4/2010 | Raszuk | |
| 7,809,806 B1 | 10/2010 | Rao et al. | |
| 8,085,686 B2 | 12/2011 | Thubert et al. | |
| 8,175,005 B2 | 5/2012 | Okmyanskiy et al. | |
| 2005/0286426 A1* | 12/2005 | Padhye et al. | 370/238 |
| 2006/0250999 A1* | 11/2006 | Zeng et al. | 370/312 |
| 2009/0161576 A1* | 6/2009 | Morris | 370/254 |
| 2011/0019590 A1 | 1/2011 | Rao et al. | |
| 2011/0103344 A1 | 5/2011 | Gundavelli et al. | |
| 2012/0063436 A1 | 3/2012 | Thubert et al. | |
| 2012/0120954 A1* | 5/2012 | Mentze et al. | 370/390 |
| 2012/0151085 A1 | 6/2012 | Singh et al. | |
| 2012/0254385 A1* | 10/2012 | Masputra | 709/223 |

(Continued)

OTHER PUBLICATIONS

Narten, et al., "Neighbor Discovery for IP Version 6 (IPv6)", Request for Comments 4861, Sep. 2007, 97 pages, Internet Engineering Task Force Trust (IETF).

(Continued)

*Primary Examiner* — Man Phan
*Assistant Examiner* — Pamit Kaur
(74) *Attorney, Agent, or Firm* — Parker Ibrahim & Berg LLC; James M. Behmke; Stephen D. LeBarron

(57) ABSTRACT

In one embodiment, the techniques herein provide that a node may receive a packet from a neighboring node in a low power and lossy network (LLN). The node may then extract, from the packet, a link-layer source address from a link layer header and an internet protocol (IP) source address from an IP header. The node may then determine whether the neighboring node originated the packet and, based on that determination, the node may correlate the link-layer source address with the IP source address to provide neighbor discovery.

25 Claims, 7 Drawing Sheets

(56) References Cited

U.S. PATENT DOCUMENTS

| | | |
|---|---|---|
| 2012/0320790 A1 | 12/2012 | Shaffer et al. |
| 2012/0327933 A1 | 12/2012 | Retana et al. |
| 2013/0036307 A1 | 2/2013 | Gagliano et al. |
| 2013/0091269 A1 | 4/2013 | Zhang et al. |
| 2013/0128739 A1* | 5/2013 | Kherani ............ H04W 28/0263 370/235 |

OTHER PUBLICATIONS

Shelby, Z. et al., "Neighbor Discovery Optimization for Low Power and Lossy Networks (6LoWPAN)", Internet-Draft Working Group, draft-ietf-6lowpan-nd-21, Aug. 2012, 61 pages, Internet Engineering Task Force Trust (IETF).

Winter, et al., "RPL: IPv6 Routing Protocol for Low-Power and Lossy Networks", Request for Comments 6550, Mar. 2012, 157 pages, Internet Engineering Task Force Trust (IETF).

* cited by examiner

ELIMINATING IPV6 NEIGHBOR SOLICITATIONS IN CONSTRAINED COMPUTER NETWORKS

TECHNICAL FIELD

The present disclosure relates generally to computer networks, and, more particularly, to reducing neighbor solicitation overhead in low power and lossy networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Neighbor Discovery (ND) protocols support a number of functions necessary to construct and maintain an IP network. For example, IPv6 ND allows IPv6 nodes/devices to discover each other's presence, determine each other's link-layer addresses, find routers, maintain reachability information for paths to active neighbors, etc. IPv6 ND has been modified to function in LLNs by using a proactive approach. For example, devices (e.g., grid mesh devices) proactively transmit IPv6 Neighbor Solicitation (NS) messages to support address resolution and maintain reachability information. A proactive approach to sending IPv6 NS messages is primarily used for two reasons: 1) the overhead associated with link-local multicast, which is typically used for ND in non-LLNs, is prohibitively expensive for a LLN, and 2) link qualities in LLNs vary continuously over time, and therefore must be actively tracked in order to maintain viable link mapping for LLN routing. Unfortunately, the use of proactive IPv6 NS messages in a LLN poses significant problems because it creates extensive control plane overhead, even when the NS messages are transmitted at a low rate.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
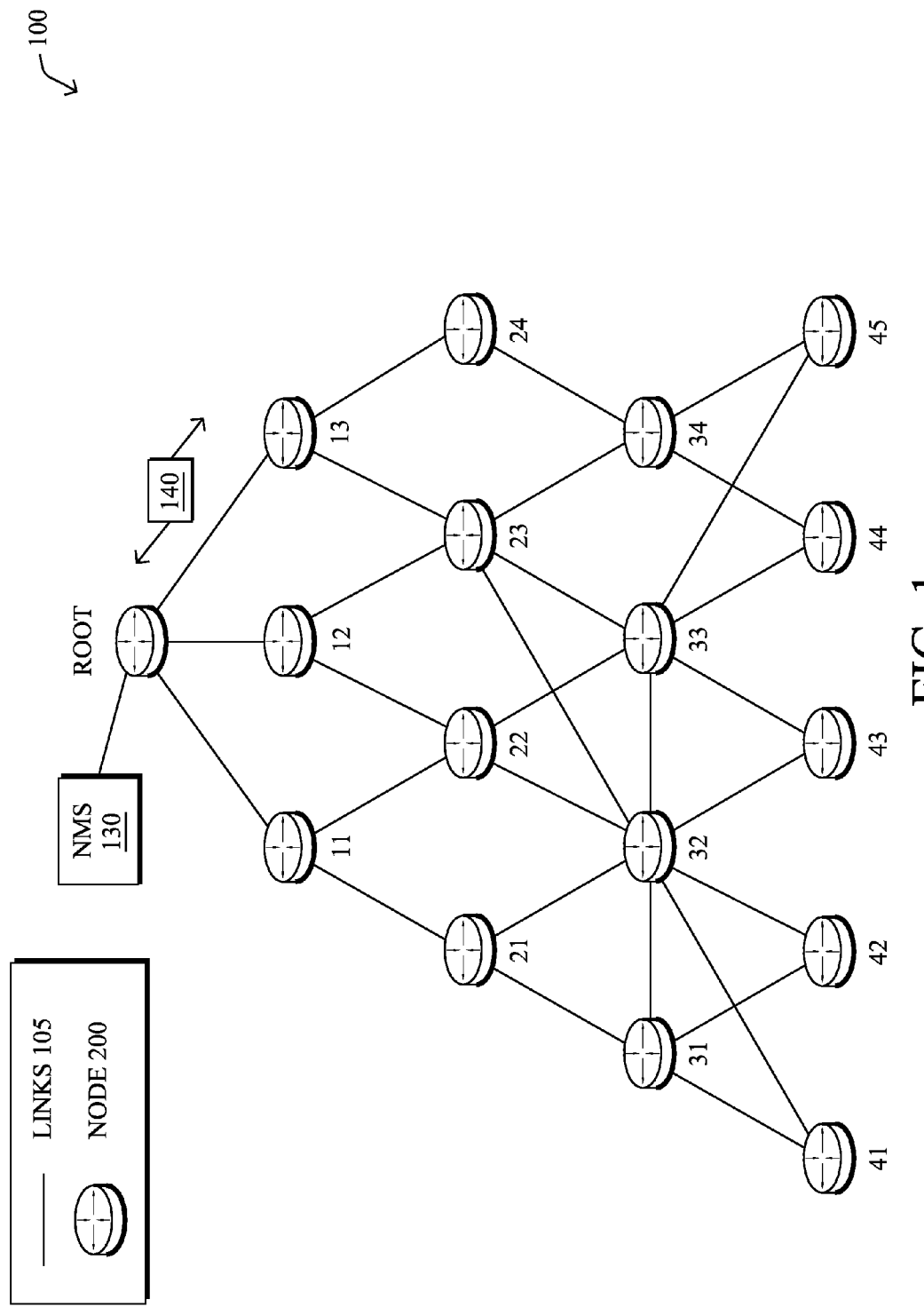
FIG. 1 illustrates an example communication network.

According to one or more embodiments of the disclosure, the techniques herein provide that a node may receive a packet from a neighboring node in a low power and lossy network (LLN). The node may then extract, from the packet, a link-layer source address from a link layer header and an internet protocol (IP) source address from an IP header. The node may then determine whether the neighboring node originated the packet and, based on that determination, the node may correlate the link-layer source address with the IP source address to provide neighbor discovery.

Also, according to one or more additional embodiments of the disclosure, a node may send a packet to a neighboring node in an LLN, and include, in the packet, a link-layer source address in a link layer header and an IP source address in an IP header. The node may then provide, in the packet, information to allow the neighboring node to determine whether it is a first hop recipient.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. In addition, network management server (NMS) 130, or other head-end application device located beyond the root node (e.g., via a WAN), may also be in communication with network 200.

Figure 2:
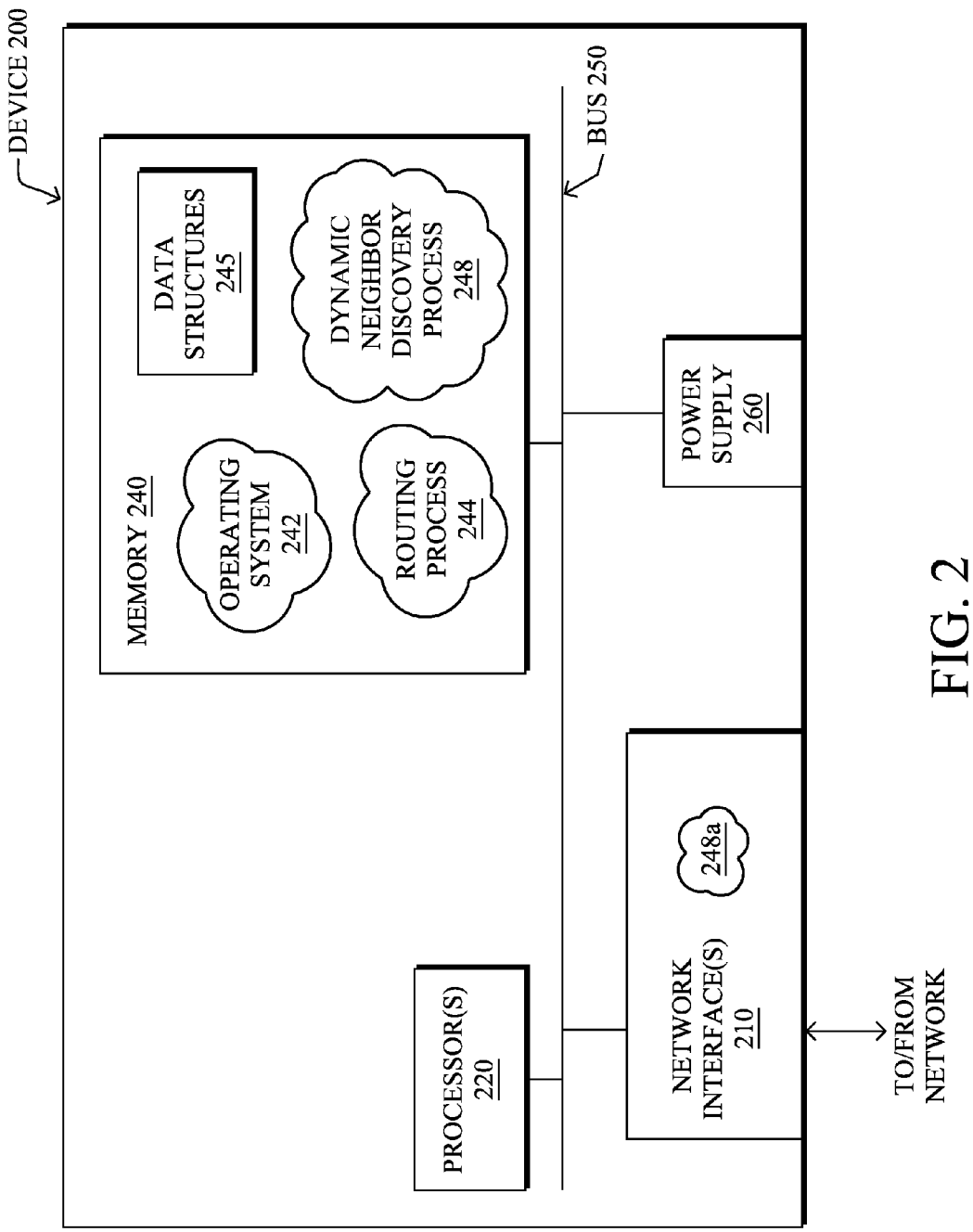
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative dynamic neighbor discovery process 248, as described herein. Note that while dynamic neighbor discovery 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices may simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

As noted above, IPv6 Neighbor Discovery (ND) (such as described illustratively in an IETF proposed standard entitled "Neighbor Discovery for IP version 6 (IPv6)" <RFC 4861>) provides a number of functions that may be used to construct and maintain an IPv6 network. For example, IPv6 ND allows IPv6 devices to discover each other's presence, determine each other's link-layer addresses, find routers, maintain reachability information about the paths to active neighbors, etc. IPv6 ND as described in RFC 4861 has been modified for use in LLNs. For example, LLN devices may use a modified form of IPv6 ND to support many of the above-described functions. In particular, such devices may transmit IPv6 Neighbor Solicitation (NS) messages to support address resolution and maintain reachability information.

To address the limited resources of LLNs, the IETF working group for Internet Protocol version 6 (IPv6) over Low power Wireless Personal Area Networks (6LoWPAN), through a draft entitled "Neighbor Discovery Optimization for Low Power and Lossy Networks (6LoWPAN)" <draft-ietf-6lowpan-nd-21> by Shelby et al. (Aug. 24, 2012 version), has defined an adaptation layer for carrying IPv6 packets in IEEE 802.15.4 frames. However, unlike RFC 4861, which describes a reactive method for sending IPv6 NS messages, 6LoWPAN uses a proactive approach to register address mapping with neighboring nodes and probe the quality of links.

A proactive approach to sending IPv6 NS messages is used in 6LoWPAN for several reasons. First, RFC 4861 relies heavily on the use of link-local multicast to reactively discover neighboring devices. Unfortunately, in LLNs, multicast routing is extremely expensive in terms of control plane overhead. Second, the quality of links in LLNs varies continuously over time; consequently, nodes/devices within the network must actively track changes in link quality either continuously or periodically. Accordingly, nodes/devices in a LLN may send IPv6 NS messages to select neighbors to (i) register their IPv6 address to link address mapping, and (ii) to probe the quality of the link.

Unfortunately, proactively sending IPv6 NS messages in a LLN presents a number of problems. First, proactive NS messaging requires a network operator to establish a balance between the control message overhead generated by the NS messages and the memory usage required to maintain the link-layer address registration information generated by the NS messages. Since nodes/devices may choose to route packets through different neighbors at different times (e.g., due to time-varying link qualities), nodes may frequently register with different neighboring devices at different times, and the lifetime associated with any particular registration is directly related to the frequency with which the node refreshes its registration with the neighbor. Second, proactive NS messaging also requires a network operator to establish a balance between the control message overhead generated by the NS messages and the responsiveness of the network to changing link conditions. For example, sending IPv6 NS messages more slowly (e.g., at a lower rate or frequency) may reduce control overhead, however, this reduction means that it may take longer for a device to detect changes in the link quality in the network. Unfortunately, it has been observed in real world LLN deployments that link qualities may change very quickly over time.

The control overhead issues associated with NS messaging within a LLN are significant. It has been observed in a LLN test environment that IPv6 NS messages may consume significant network resources, even when transmitted at a very low rate. For example, in a test LLN comprising 4,000 nodes within a single hop of a Field Area Router (FAR), which is a configuration that is representative of dense urban environments, when IPv6 NS messages were transmitted at a 30 minute period, the FAR received over 2.2 NS messages per second. Given that an LLN link has an illustrative theoretical capacity of 75 kbps, these results make it clear that IPv6 NS messages consume significant network overhead. Therefore, control plane overhead consumed by NS messaging is a critical problem in existing LLN deployments.

Eliminating/Reducing IPv6 Neighbor Solicitations in LLNs

The techniques herein provide for neighbor discovery based on existing network traffic, which provides a portion of the information (e.g., the IP address header, the link address header, etc.) needed to register the IP address (e.g., the IPv6 address) to the link address mapping, while eliminating/reducing the need for proactive neighbor solicitation messages. The techniques herein enable a node/device within a LLN to determine whether the IP Source Address in a received packet is assigned to the neighboring node that transmitted the packet, e.g., by one or more embodiments including: observing the IPv6 Hop Limit or Destination Address fields, including an IPv6 Hop-by-Hop Option, using IPv6-in-IPv6 tunneling, etc. In other words, the techniques herein provide that neighbor discovery may take place without the need to proactively send NS messages.

Specifically, according to one or more embodiments of the disclosure as described in detail below, the techniques herein provide that a node may receive a packet from a neighboring node in an LLN. The node may then extract, from the packet, a link-layer source address from a link layer header and an IP source address from an IP header. The node may then determine whether the neighboring node originated the packet and, based on that determination, the node may correlate the link-layer source address with the IP source address to provide neighbor discovery. In addition, the techniques herein further provide that a node may send a packet to a neighboring node in a LLN, and include, in the packet, a link-layer source address in a link layer header and an IP source address in an IP header. The node may then provide, in the packet, information to allow the neighboring node to determine whether it is a first hop recipient.

Illustratively, the techniques described herein may be performed by hardware, software, and/or firmware, such as in accordance with the "dynamic neighbor discovery" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, and as such, may be processed by similar components understood in the art that execute those protocols, accordingly.

Operationally, the techniques herein generally relate to neighbor discovery by a node receiving "normal" network traffic from a neighboring node. More specifically, the techniques herein relate to neighbor discovery based on the ability of a node receiving a normal network packet from a neighboring node (e.g., data traffic) to extract address information from one or more packet header fields present in the packet, and combine that information with the receiving node's determination as to whether or not the neighboring node corresponds to the IP source address of the node originating the packet.

Figure 3:
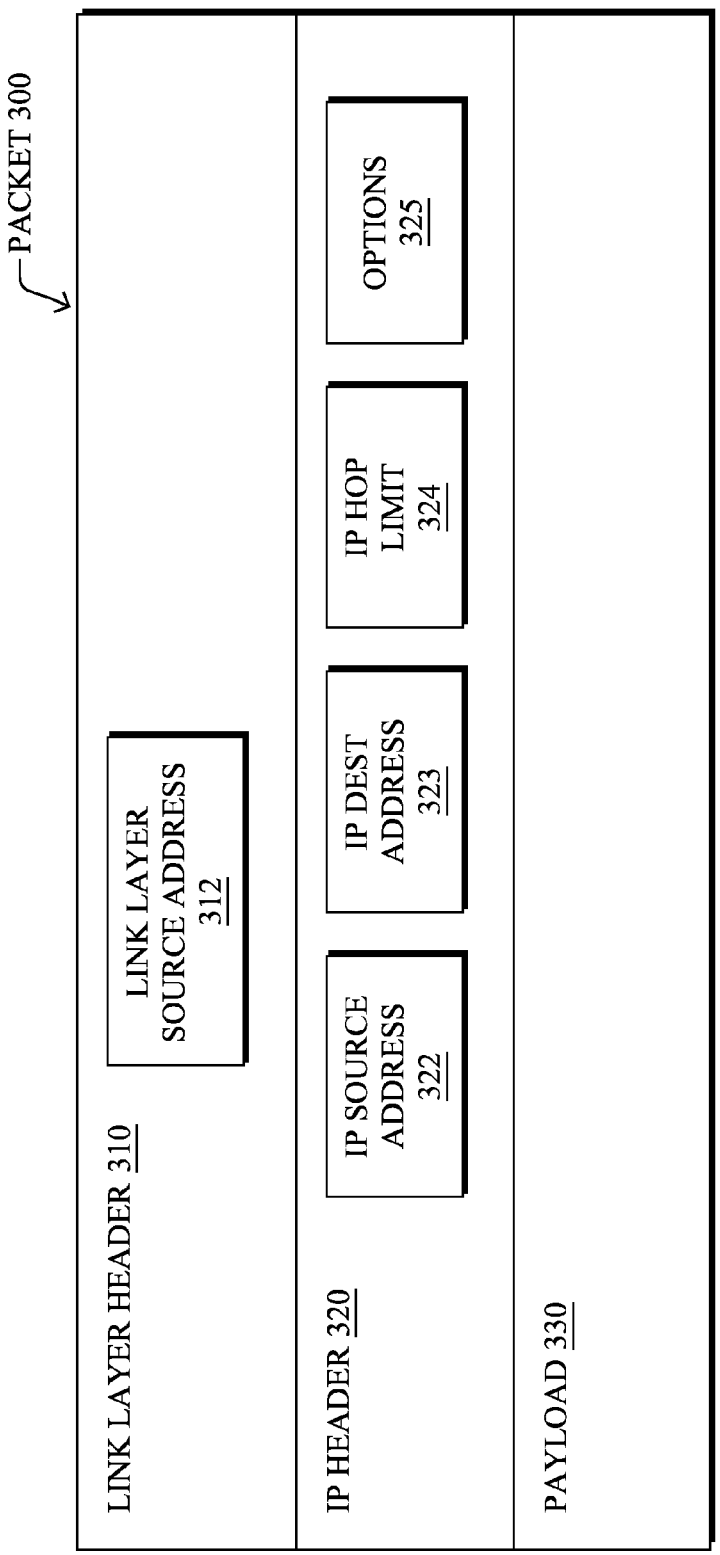
FIG. 3 illustrates an example message format.

The present disclosure is based, at least in part, on the realization that most packets within normal network traffic comprise much of the information necessary to perform address resolution and provide link quality information. For example, typical network packets may include one or more packet header fields such as, as shown in FIG. 3, a link layer header 310 (e.g., IEEE 802.15.4), an IP source address header 320 (e.g. an IPv6 header), etc., in addition to the carried payload 330. Additionally, many packets sent via unicast in LLNs typically request a link-layer acknowledgment since most L2 technologies such as, for example, 15.4 support acknowledgments. In other words, existing control and data messages may be sufficient to perform the necessary functions required by IPv6 NS messages. For example, RPL requires each node to send control messages ("DAO" messages) towards the root to build and maintain downward routing state in order to forward packets from the root to each LLN node/device. Additionally, LLN applications typically have message flows that transit through the root (e.g., messages typically flow from a LLN node/device to the root, or from the root to a LLN device). These control and data flows are, in many cases, constant rate traffic readily available/accessible to nodes/devices within the network.

Figure 4:
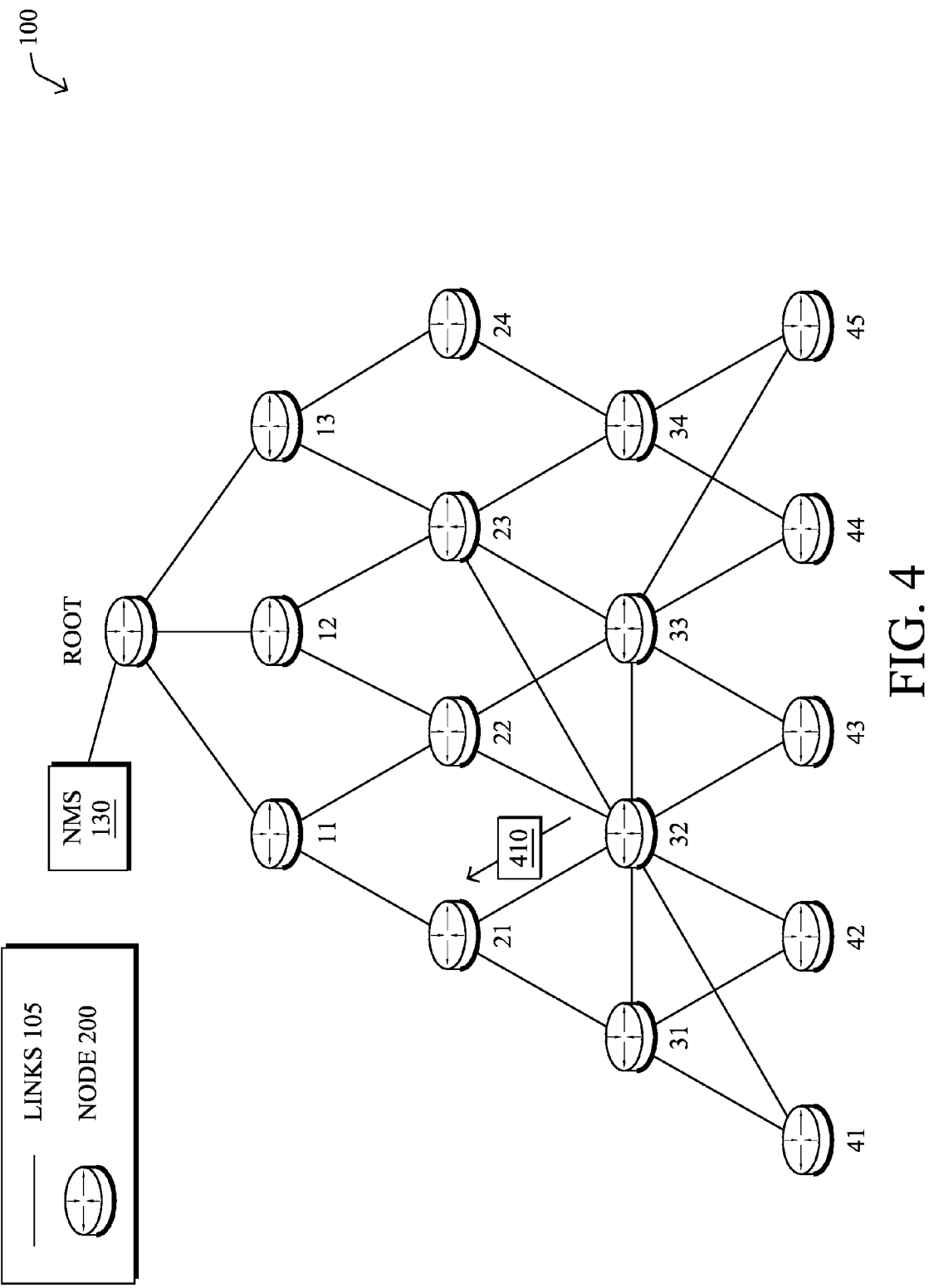
FIG. 4 illustrates an example of directed acyclic graphs (DAGs) in the computer network in FIG. 1.

Illustratively, a receiving node/device may perform neighbor discovery by utilizing existing messages to perform the same functions as a dedicated IPv6 NS messages. As shown in FIG. 4, a node 21 may receive a packet 410 (e.g., an IPv6 packet) from neighboring node 32 and extract and use the source addresses 312/322 contained in, for example, the link-layer header 310 and/or the IP source header 320 (respectively) to maintain the address mapping. The only critical piece of information required for neighbor discovery that is missing from a conventional packet is whether or not the IP source address 322 in header 320 corresponds to that of neighboring node 32 that sent the packet. While the link-layer address 312 must, by definition, be assigned to the neighboring node/device, the IP source address 322 is assigned to the source of the packet (e.g., perhaps, as an example, node 43). According to the techniques herein, receiving node 21 may obtain this missing information by determining whether or not it is the first hop of the forwarded packet from the neighboring node 32.

In one embodiment, the node/device may determine that it is the first hop whenever the IP Hop Limit field 324 in the received packet is set to a maximum value (e.g., 255 for an eight-bit field). Since a node/device within a LLN may not forward a packet that contains an IP Hop Limit of zero, an IP Hop Limit value of 255 may indicate that the receiving node/device is the first hop. Advantageously, this mechanism requires no additional overhead; however, a disadvantage of this mechanism is that it requires the neighboring node (e.g., the source node) to set the IP Hop Limit field to 255, which may limit certain network functions (e.g., traceroute, minimizing effects of forwarding loops, etc.) that may require a lower IP Hop Limit.

In another embodiment, a node/device may determine that it is the first hop whenever the IP Destination Address 323 has a link-local scope. An advantage of this mechanism is that it does not require any additional overhead. A disadvantage is that it requires the IPv6 Destination Address to have link-local scope, which may mean that the neighboring node/device cannot address nodes/devices that are off the link.

In another embodiment, the packet's source node/device may include an IP Hop-by-Hop Option (options 325) that indicates whether the packet is on its first hop. The IP Hop-by-Hop Option may simply include a flag that is cleared by the first router along the path. Alternatively, the IP Hop-by-Hop Option may include a counter that tracks the number of hops that the packet has traversed. Advantageously, this approach does not place any limitations on the IP header fields. However, a disadvantage of this approach is that it adds header overhead, and also requires each router along the path to process the IP Hop-by-Hop Option.

Figure 5:
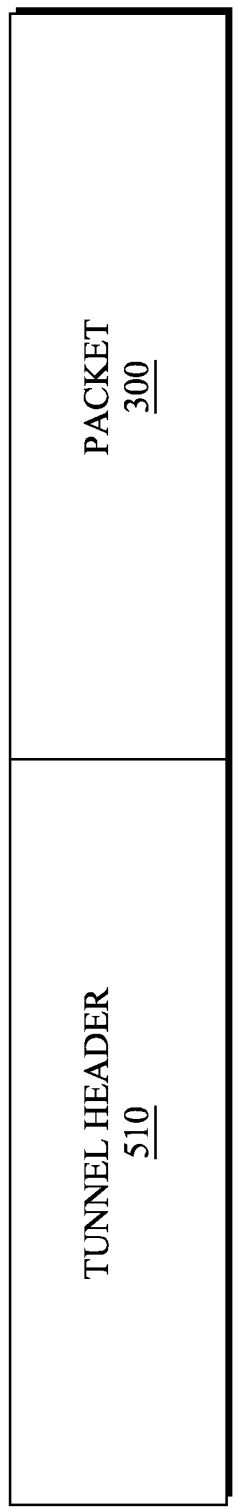
FIG. 5 illustrates an example of neighbor discovery in the computer network of FIG. 1.

In another embodiment, the packet's source node/device may use, e.g., IPv6-in-IPv6 tunneling. For example, the source may encapsulate the original IPv6 packet 300 in an IPv6 tunnel header 510 that uses link-local addressing, as shown in FIG. 5. The IPv6 tunnel header may or may not include an IPv6 Option. A node/device receiving the message may first de-capsulate the message, store the IPv6 to link address mapping, and forward the packet as discussed above. Alternatively, a node/device may encapsulate an existing packet that it is forwarding in an IP tunnel header. The IP tunnel header may have a link-local destination address pointing to the next hop and a global IP address assigned to the forwarding device. The router receiving the tunnel message may then extract the IP Source Address from the tunnel header and register the link source address with it. The router then decapsulates the origin IP packet and forwards the packet as usual. An advantage of tunnel headers is that there is no modification to the forwarded message along the route, with the exception of the first hop. A disadvantage of this approach is that it requires some additional header overhead.

It is contemplated within the scope of the disclosure that a node/device implementing the techniques herein may implement all of the above-described embodiments, and choose the method most appropriate to the specific packet.

The techniques herein further provide that the additional information described above may be inserted into select network traffic to provide neighbor discovery. In one embodiment, a router may choose a fixed fraction of messages to which to add the necessary information (e.g., 1 out of every 10 packets). In another embodiment, a router may choose to add the information based on time (e.g., after a T minute timer expires, add the information to the next packet and reset the timer). In yet another embodiment, a router may simply add the information to all packets.

In addition, the techniques herein provide that a node/device may dynamically suppress NS messages as other existing traffic is being sent. For example, a node/device may periodically send messages to select neighboring devices (e.g., RPL Parents) to refresh the IPv6 to link address mapping and probe the link qualities. For instance, in the absence of any traffic, the device must transmit IPv6 NS messages. However, whenever a device communicates existing traffic, it may reset its IPv6 NS timer to further delay the transmission of IPv6 NS messages. If the router forwards enough existing traffic, it will not send any dedicated IPv6 NS messages.

In yet another embodiment, a node may decide whether or not to send an IPv6 NS message (e.g., in the absence of traffic) according to the link quality fluctuation. For example, if the link is fairly stable, this indicates that the frequency of sending such message may be further decreased (this also applied to the "Delay" mentioned above).

It is also contemplated within the scope of the disclosure that a node/device may configure the lifetime of the address registrations. Draft-ietf-6lowpan-nd noted above specifies a new IPv6 ND option which is included in IPv6 NS messages, allowing the source to specify the lifetime of the registration, which may also correspond to the frequency of sending IPv6 NS messages. In one embodiment, the network may be configured to utilize a default lifetime, eliminating the need to include an explicit lifetime field in every message that serves as an address registration. The lifetime may be included in IPv6 Router Advertisements or other control messages (e.g., RPL "DIO" messages).

Figure 6:
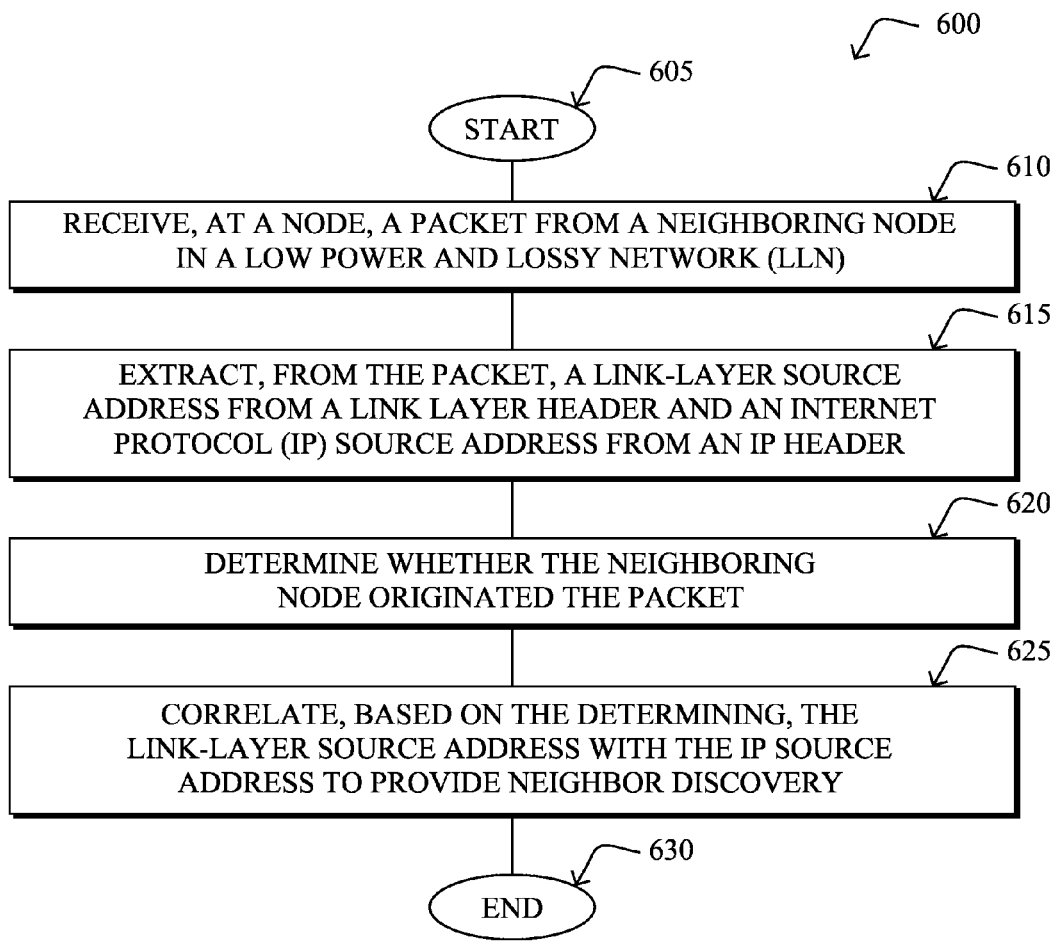
FIG. 6 illustrates an example simplified procedure for neighbor discovery that eliminates neighbor solicitation (NS) messages in a LLN.

FIG. 6 illustrates an example simplified procedure 600 for neighbor discovery that eliminates/reduces neighbor solicitation messages within a LLN in accordance with one or more embodiments described herein, particularly from the perspective of the receiving device. The procedure 600 may start at step 605, and continues to step 610, where, as described in greater detail above, a node may receive a packet from a neighboring node in a low power and lossy network (LLN). As shown in step 615, the node may then extract, from the packet, a link-layer source address from a link layer header and an internet protocol (IP) source address from an IP header. Once this information has been extracted, the node may then determine whether the neighboring node originated the packet, as shown in step 620, and based on that determination, the node may correlate the link-layer source address with the IP source address to provide neighbor discovery as shown in step 625. The simplified procedure 600 may then end in step 630.

Figure 7:
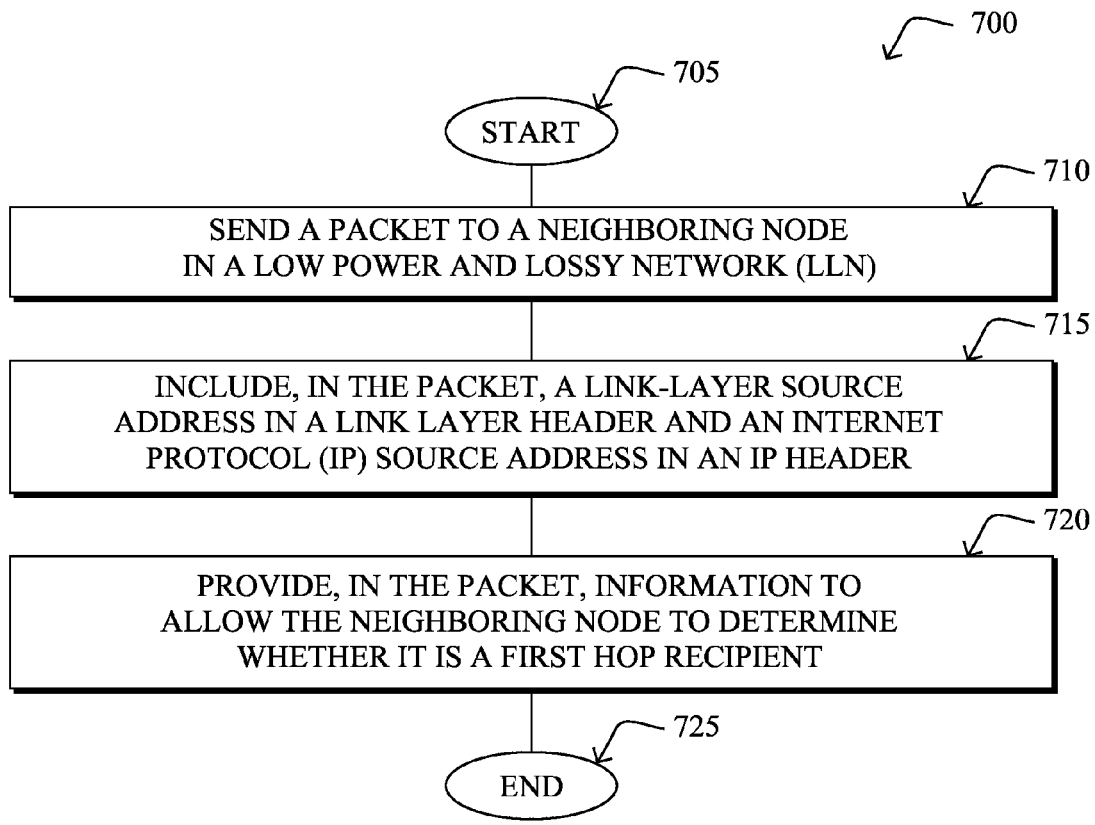
FIG. 7 illustrates another example simplified procedure for neighbor discovery that eliminates NS messages in a LLN.

In addition, FIG. 7 illustrates an another example simplified procedure 700 for neighbor discovery that eliminates/reduces neighbor solicitation messages within a LLN in accordance with one or more embodiments described herein, particularly from the perspective of the sending device. The procedure 700 may start at step 705, and continues to step 710, where, as described in greater detail above, a node may send a packet to a neighboring node in a LLN, and include, in the packet, a link-layer source address in a link layer header and an internet protocol (IP) source address in an IP header as shown in step 715. As depicted in step 720, the node may then provide, in the packet, information to allow the neighboring node to determine whether it is a first hop recipient. The simplified procedure 700 may then end in step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, may eliminate or reduce IPv6 neighbor solicitations in constrained networks while providing for neighbor discovery based on routine network traffic and the ability of a receiving node to determine whether the neighboring node that sent the packet is the node that corresponds to the IP Source address within the packet header.

While there have been shown and described illustrative embodiments that provide for dynamic neighbor discovery without neighbor solicitations in constrained networks, it is to be understood that various other adaptations and modifications may be made within the spirit and scope of the embodiments herein. For example, the embodiments have been shown and described herein with relation to LLN networks. However, the embodiments in their broader sense are not as limited, and may, in fact, be used with other types of shared-media networks and/or protocols (e.g., PLC, AMI, wireless, etc.). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a node, a packet from a neighboring node in a low power and lossy network (LLN), the packet part of existing network traffic;
extracting, from the packet, a link-layer source address from a link layer header and an internet protocol (IP) source address from an IP header;
determining whether the neighboring node originated the packet; and
correlating, based on the determining, the link-layer source address with the IP source address to provide neighbor discovery, wherein neighbor discovery is achieved without proactively sending neighbor solicitation (NS) messages between the node and the neighbor node via the correlation of the link-layer source address and IP source address of the packet, wherein the IP source address is registered to a link address mapping as a result of the correlation.

2. The method as in claim 1, wherein determining further comprises:
identifying a value of an Hop Limit Field in the packet; and
determining that the neighboring node originated the packet if the value is set to a maximum.

3. The method as in claim 1, wherein determining further comprises:
identifying that an IP Destination Address has link local scope; and in response, determining that the neighboring node originated the packet.

4. The method as in claim 1, wherein determining further comprises:
identifying a value of an IPv6 Hop-by-Hop Field in the packet; and
determining, based on the value, that the neighboring node originated the packet.

5. The method as in claim 4, wherein the value is a number generated by a hop counter in the packet, and the neighboring node originated the packet if the value is 1, but not if the value is greater than 1.

6. The method as in claim 4, wherein the value is a flag that is cleared by a first node that receives the packet, and the neighboring node originated the packet if the flag is present.

7. The method as in claim 1, wherein determining further comprises:
decapsulating an encapsulated packet;
identifying an address in a Tunnel Header in the decapsulated packet;
determining that the neighboring node originated the packet based on the IPv6 Tunnel Header having a link local address.

8. The method as in claim 7, wherein the Tunnel Header comprises an IPv6 Hop-by-Hop field.

9. A method, comprising:
sending a packet to a neighboring node in a low power and lossy network (LLN), the packet part of existing network traffic;
including, in the packet, a link-layer source address in a link layer header and an internet protocol (IP) source address in an IP header; and
providing, in the packet, information to allow the neighboring node to determine whether the neighbor node is a first hop recipient to cause the neighboring node to correlate the link-layer source address and the IP source address for neighbor discovery, wherein the neighbor discovery is achieved without proactively sending neighbor solicitation (NS) messages between the node and the neighbor node by including the link-layer source address and the IP source address in the existing network traffic.

10. The method as in claim 9, wherein providing further comprises:
including a value of a Hop Limit Field in the packet; and
setting the value to a maximum if the neighboring node is the first hop.

11. The method as in claim 9, wherein providing further comprises:
including an IP Destination Address, wherein the neighboring node is the first hop if the IP Destination Address has link local scope.

12. The method as in claim 9, wherein providing further comprises:
including a value of an IPv6 Hop-by-Hop Field in the packet allow the neighboring node to determine whether it is a first hop recipient.

13. The method as in claim 12, wherein the value is a number generated by a hop counter in the packet, and the neighboring node is the first hop if the value is 1, but not if the value is greater than 1.

14. The method as in claim 12, wherein the value is a flag that is cleared by a first node that receives the packet, and the neighboring node is the first hop if the flag is present.

15. The method as in claim 9, wherein providing further comprises:
encapsulating the packet in a Tunnel Header; and
sending the encapsulated packet to the neighbor, wherein the neighbor is the first hop if the Tunnel Header has a link local address.

16. The method as in claim 15, wherein the Tunnel Header comprises an IPv6 Hop-by-Hop field.

17. An apparatus, comprising:
one or more network interfaces to communicate with a low power and lossy network (LLN);
a processor coupled to the network interfaces and adapted to execute one or more processes; and
a memory configured to store a process executable by the processor, the process when executed operable to:
receive a packet from a neighboring node in a low power and lossy network (LLN), the packet part of existing network traffic;
extract, from the packet, a link-layer source address from a link layer header and an internet protocol (IP) source address from an IP header;
determine whether the neighboring node originated the packet; and
correlate, based on the determining, the link-layer source address with the IP source address to provide neighbor discovery, wherein the neighbor discovery is achieved without proactively sending neighbor solicitation (NS) messages between the node and the neighbor node via the correlation of the link-layer source address and IP source address of the packet, wherein the IP source address is registered to a link address mapping as a result of the correlation.

18. The apparatus as in claim 17, wherein the process when executed is further operable to:
identify a value of an Hop Limit Field in the packet; and
determine that the neighboring node originated the packet if the value is set to a maximum.

19. The apparatus as in claim 17, wherein the process when executed is further operable to:
identify that an IP Destination Address has link local scope; and in response,
determine that the neighboring node originated the packet.

20. The apparatus as in claim 17, wherein the process when executed is further operable to:
identify a value of an IPv6 Hop-by-Hop Field in the packet; and
determine, based on the value, that the neighboring node originated the packet.

21. The apparatus as in claim 17, wherein the process when executed is further operable to:
decapsulate an encapsulated packet;
identify an address in a Tunnel Header in the decapsulated packet; and
determine that the neighboring node originated the packet based on the IPv6 Tunnel Header having a link local address.

22. An apparatus, comprising:
one or more network interfaces to communicate with a low power and lossy network (LLN);
a processor coupled to the network interfaces and adapted to execute one or more processes; and
a memory configured to store a process executable by the processor, the process when executed operable to:
send a packet to a neighboring node in a low power and lossy network (LLN), the packet part of existing network traffic;
include, in the packet, a link-layer source address in a link layer header and an internet protocol (IP) source address in an IP header; and
provide, in the packet, information to allow the neighboring node to determine whether the neighbor node is a first hop and to cause the neighboring node to correlate the link-layer source address and the IP source address for neighbor discovery, wherein the neighbor discovery is achieved without proactively sending neighbor solicitation (NS) messages between the node and the neighbor node by including the link-layer source address and the IP source address in the existing network traffic.

23. The apparatus as in claim 22, wherein the process when executed is further operable to:
include a value of a Hop Limit Field in the packet; and
setting the value to a maximum if the neighboring node is the first hop.

24. The apparatus as in claim 22, wherein the process when executed is further operable to:
include an IP Destination Address, wherein the neighboring node is the first hop if the IP Destination Address has link local scope.

25. The apparatus as in claim 22, wherein the process when executed is further operable to:
include a value of an IPv6 Hop-by-Hop Field in the packet to allow the neighboring node to determine whether it is a first hop recipient.

* * * * *